United States Patent [19]

Smith

[11] 4,247,978

[45] Feb. 3, 1981

[54] METHODS OF MAKING SLOT LINERS AND STATOR ASSEMBLIES INCLUDING SAME

[75] Inventor: Chester A. Smith, Ottawa County, Mich.

[73] Assignee: General Electric Company, Fort Wayne, Ind.

[21] Appl. No.: 922

[22] Filed: Jan. 4, 1979

Related U.S. Application Data

[62] Division of Ser. No. 795,738, May 11, 1977, Pat. No. 4,151,436.

[51] Int. Cl.³ .......................................... H02K 15/10
[52] U.S. Cl. ...................................... 29/596; 29/734; 493/405; 310/215
[58] Field of Search .......................... 29/596, 598, 734; 93/1 R; 310/214, 215

[56] References Cited

U.S. PATENT DOCUMENTS

| | | | |
|---|---|---|---|
| 1,695,862 | 12/1928 | Sandfield | 310/215 |
| 2,173,726 | 9/1939 | Prindle | 310/215 |
| 2,473,332 | 6/1949 | England | 310/215 |
| 2,565,530 | 8/1951 | Smith | 310/214 X |
| 2,701,316 | 2/1955 | Willits | 310/14 |
| 2,778,964 | 1/1957 | Balke | 310/14 |
| 2,985,780 | 5/1961 | Bigelow | 310/15 |
| 2,998,540 | 8/1961 | Phillips | 310/14 |
| 3,210,580 | 10/1965 | Profitt | 310/15 |
| 3,579,791 | 5/1971 | Arnold | 29/736 |
| 3,616,512 | 11/1971 | Appenzeller | 29/734 |
| 3,698,063 | 10/1972 | Smith | 29/736 |
| 3,703,854 | 11/1971 | Schlandroff | 29/734 |
| 3,745,394 | 7/1973 | Mason | 29/734 |
| 3,829,953 | 8/1974 | Lauer et al. | 29/736 |
| 3,949,464 | 4/1976 | Walker | 29/596 |

OTHER PUBLICATIONS

Machine Products Corp. photos and sketch furnished by applicant in parent case.

Primary Examiner—Carl E. Hall
Attorney, Agent, or Firm—Ralph E. Krisher, Jr.

[57] ABSTRACT

Methods are disclosed for making a slot liner for electrically insulating electric coils from a magnetic core. The slot liner comprises a piece of insulating sheet material having first and second sides and first and second ends. The sheet material is folded upon itself in opposite directions at each end thereof to establish end portions of double thickness. In other words, the sheet material is folded back upon itself at the first end to lie adjacent the first side thereof to form a first end portion of double thickness; and folded back upon itself at the second end to lie adjacent the second side thereof to form a second end portion of double thickness. The double thickness ends may be further folded upon themselves (but in a common direction) to establish cuffs. In other words, the first and second ends of the sheet material of double thickness may be folded back upon themselves toward the first side of the sheet material to form a cuff at each end. This approach permits the use of thinner (and therefore less expensive) insulating material than has been used heretofore, and yet avoids (or reduces) "cut through" problems at the faces of stator cores when the insulators are used in core slots. Preferred embodiments also facilitate axial insertion of slot liners along core slots, and axial insertion of windings along the previously placed slot liners.

3 Claims, 12 Drawing Figures

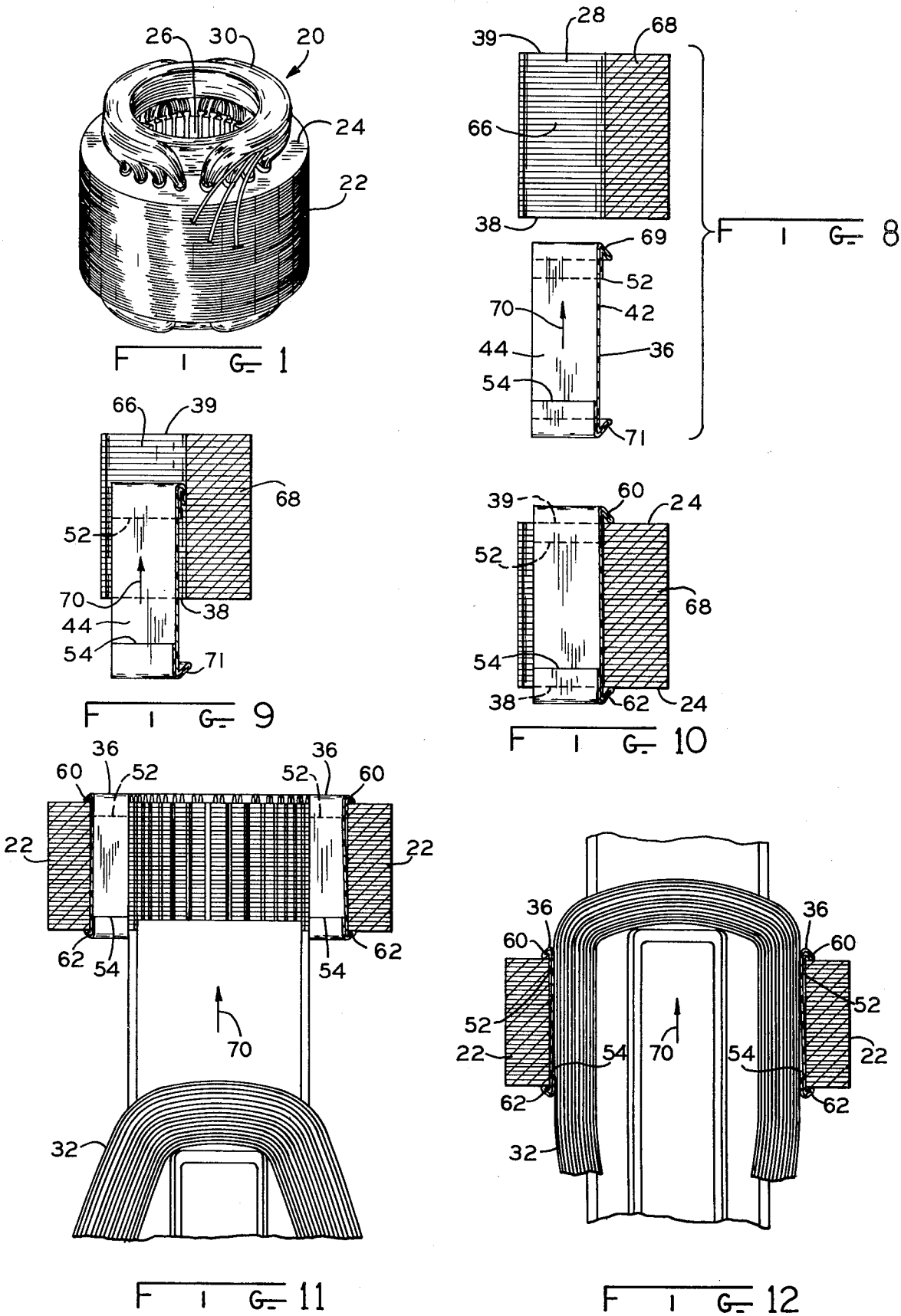

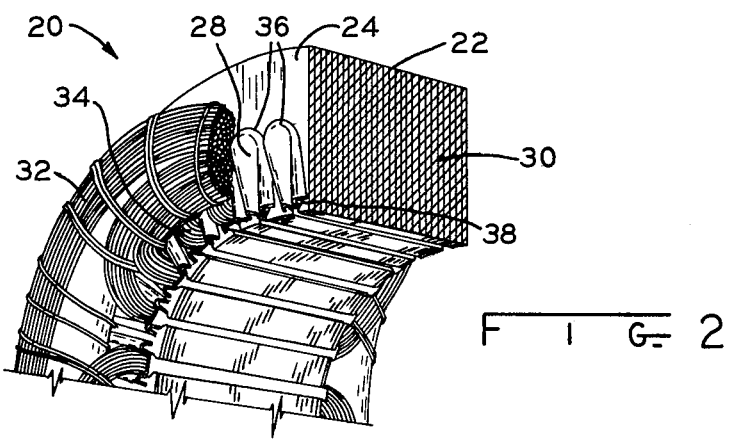
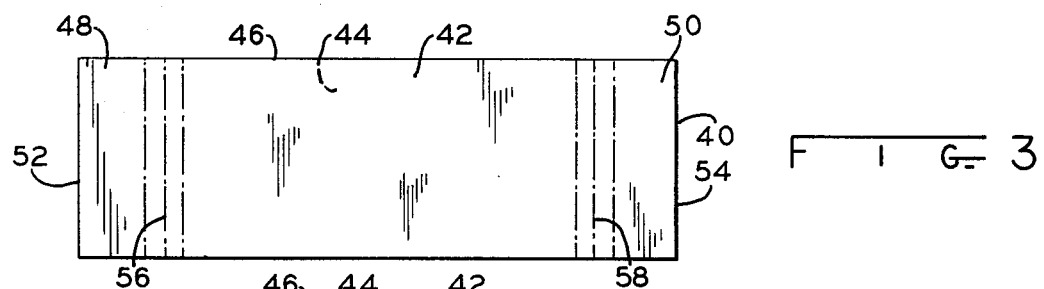
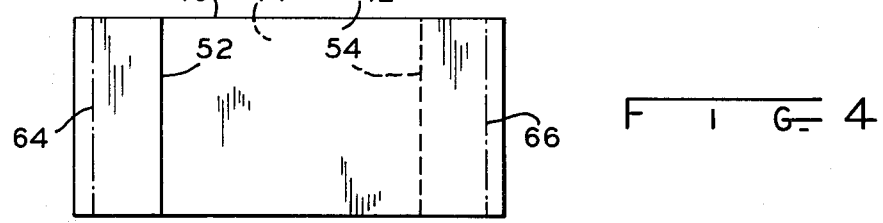
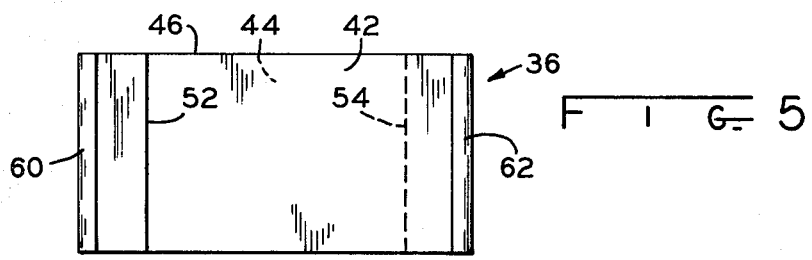
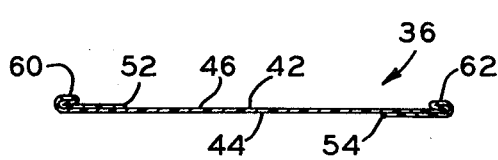
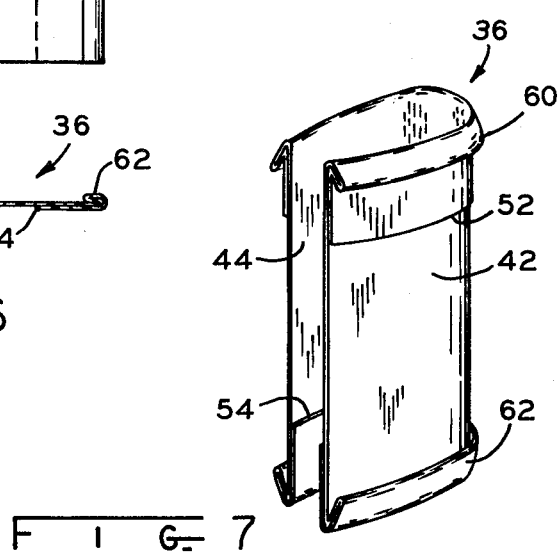

METHODS OF MAKING SLOT LINERS AND STATOR ASSEMBLIES INCLUDING SAME

CROSS REFERENCE TO RELATED APPLICATION

This application is a division of my copending application Ser. No. 795,738 filed May 11, 1977, now U.S. Pat. No. 4,151,436 and the entire disclosure of which is incorporated herein by reference.

BACKGROUND OF THE INVENTION

The present invention generally relates to methods of making electrical insulators for magnetic cores and more particularly to methods of making slot liners for stator cores of fractional and small integral horsepower motors; to methods of placing such slot liners in core slots; and to methods of making stator assemblies that include such slot liners.

Slotted magnetic cores used in dynamoelectric machines, such as electric motors and generators, have conductors disposed in slots thereof; and it is necessary that a layer of dielectric material separate certain surfaces of the cores and the electrical conductors accommodated thereby. Taking an induction motor stator core, for example, electrical coils are carried in slots that extend axially through the core and that have entrances in communication with a central bore adapted to receive a rotor. These conductors are themselves covered with a layer of insulating material, but additional insulation is usually required along core slots and especially at the ends thereof to reduce (if not prevent) abrasion or other damage of the insulation on the conductors and to prevent grounding of the conductors to the core. Such additional insulation is especially desirable should the coil insulation be abraded, chipped, or cracked, and even more so in the vicinity of the usually sharp edges of the slots at the core end faces. One desirable approach for insulating the slots is the employment of slot liners fabricated from suitable dielectric strip material. Such slot liners are inserted into the core slots either manually or with the use of inserting equipment, as will be understood by persons skilled in the art.

One problem with respect to dynamoelectric machine insulation of the slot liner type is the cost of the insulating material itself, examples of which are polyamide materials, or polyester materials, one specific example of which is polyethylene terephalate and which is available as a film under trade names such as "MYLAR" and "MELINEX". For more economical use of such material, it is generally desirable to use a minimum thickness of such material, so long as adequate insulating and strength properties are not sacrificed. However, it has been found (for strength purposes) that a relatively greater thickness of material is needed for those portions of the slot liners adjacent to the end faces of the core than along the side walls of such slots. Since slot liners usually are made from strip material, this in turn has required the use of thicker material along the slot walls than would otherwise be necessary for obtaining the desired insulating (or dielectric) properties.

In one particular slot liner arrangement that has been offered for sale more than one year prior to the filing of this application, a slot liner is formed by folding opposite ends of a piece of relatively thin insulating material upon itself in a common direction at both ends to form two end portions of double thickness insulating material and then both double thickness end portions are again folded in a common direction to form cuffs at each end portion. The above-mentioned slot liner and other slot liners employing folding of insulating material upon itself in a common direction at both ends thereof reduce the amount of insulating material used for a given insulator.

My work along these lines, however, has revealed that this approach of others of folding thick material upon itself (so that double thicknesses of material will be adjacent the ends or "corners" of slots) should result in manufacturing problems when existing equipment and processes are used to axially insert such slot liners in core slots (as taught for example in Mason U.S. Pat. No. 3,745,394 or Schlaudroff U.S. Pat. No. 3,703,854) or to axially insert windings along such slots (as taught for example in Arnold U.S. Pat. No. 3,579,791; Lauer and Pieper U.S. Pat. No. 3,829,953; or Smith U.S. Pat. No. 3,698,063).

For example, the thin material might be folded on itself to facilitate the axial insertion of slot insulators along core slots, but later axial insertion of windings could tend to unfold the insulator. On the other hand, if the insulator is folded in a direction to facilitate winding insertion, difficulties might be encountered when placing the insulators in the slots.

Accordingly, it would be desirable to provide new and improved methods of making a slot liner which can result in substantial savings in insulating material usage, but which also may facilitate ready insertion of the slot liner in core slots by using proven methods and apparatus, and that would not interfere with using known winding insertion methods.

Accordingly, objects of the present invention are to provide new and improved methods of making slot liners.

Other objects of the present invention are to provide new and improved methods of making insulated dynamoelectric machine stator cores.

Yet other objects of the present invention are to provide new and improved methods of making dynamoelectric machine stator assemblies.

SUMMARY OF THE INVENTION

In carrying out objects of the invention in one form thereof, I select a piece of insulating material and fold opposite ends thereof in opposite directions relative to each other and relative to a central portion thereof. Then, if cuffs are desired for a particular application, the opposite ends of the piece (now comprising insulating material of double thickness) are folded upon themselves in a common direction relative to the central portion of the piece. The piece of insulating material or slot liner is then deformed such as, for example, in a U-shaped configuration for subsequent insertion into axial extending slots of a magnetic stator core. The slot liner is then advanced or inserted into the axially extending slots of the stator core, with the slot liner oriented such that the end of the slot liner first inserted has a raw edge disposed adjacent the wall of the slot, and such that the opposite or trailing end of the slot liner has a raw end disposed adjacent the central portion on the side of the slot liner opposite the other raw end.

After the slot liners have been inserted in the axially extending slots of the stator core, stator windings are inserted into the slots with the slot liners being disposed between the stator core and the windings. The windings are inserted into the stator slots having slot liners therein in the same axial direction as that employed for insertion of the slot liners, thus the windings will not unfold either of the raw ends of the slot liner.

One specific slot liner, which may be fabricated using the above-described method, comprises a piece of insulating material having a central portion and opposite end portions each connected to the central portion. The opposite end portions are folded in opposite directions relative to each other and relative to the central portion; thus, the ends or extremities are insulating material sections of double thicknesses. The ends or extremities also include cuffs extending in a common direction relative to the central portion which are formed from the sections of double thickness material.

BRIEF DESCRIPTION OF THE DRAWINGS

FIG. 1 illustrates a stator assembly for a dynamoelectric machine.

FIG. 2 is an enlarged perspective view of a portion of the stator assembly of FIG. 1.

FIG. 3 is a plan view of a piece of insulating material employed to form a slot liner when practicing the invention in one form.

FIG. 4 is a plan view of the insulating material of FIG. 3 and illustrates an intermediate step in forming the slot liner.

FIG. 5 is a plan view of the insulating material of FIGS. 3 and 4 and illustrates the slot liner in its final form.

FIG. 6 is a side elevational view of the slot liner of FIG. 5.

FIG. 7 is a perspective view of the slot liner of FIGS. 5 and 6.

FIGS. 8, 9, and 10 are detail sectional views of one of the stator core slots and illustrate insertion of the slot liner into the core slot.

FIGS. 11 and 12 are detail sectional views of two stator slots with slot liners therein and illustrate coil insertion relative to the slot liners.

DESCRIPTION OF THE PREFERRED EMBODIMENT

FIGS. 1 and 2 illustrate a stator magnetic core assembly 20 comprising a magnetic core 22 having end faces 24, a centrally extending bore 26 and a plurality of slots 28, extending axially through the core and opening into or communicating with the centrally extending bore. The magnetic core is formed from a series of laminations 30 but may take on other suitable forms. The stator assembly also comprises coils 32, having portions extending axially along the slots of the magnetic core. These coils are formed by a plurality of turns of an insulated conductor 34. Slot liners 36 extending axially through the core slots, are formed of any of the well known electrical insulating materials such as polyamide materials or polyester materials, one specific example of which is polyethylene terephalate which is available as a film under trade names such as "MYLAR" and "MELINEX", and provide additional insulation to prevent grounding of the coils to the magnetic core resulting from abrasion of the coils at core slot edges 38 and 39 (not shown).

The maximum thickness required for the slot liner is generally controlled by the strength requirements of the insulating material at the slot edges of the magnetic core. A single thickness material for slot liners usually results in the use of excessive amounts of insulating material because an insulating material of much lesser thickness can be employed within the interior of the slot away from the slot edges. In order to reduce material thickness, slot liners have previously been formed by folding pieces of insulating material at their end portions. However, this method may result in manufacturing problems caused by the slot liner being unfolded either during slot liner insertion or during coil insertion. In order to prevent the encountering of any such problems, a new and improved method of forming a slot liner has been developed using insulating material of a lesser thickness while still retaining the required strength at the edges of the core slots. The new and improved method prevents slot liner unfolding during either the slot liner insertion or during insertion of the coils.

Referring to FIGS. 3-5, one preferred method of fabricating new and improved slot liners is illustrated. FIG. 3 shows a piece of insulating material 40, preferably formed of a well known commercially available material, such as "MYLAR" film of E. I. DuPont de Nemours & Company. As illustrated in FIG. 3, the piece of insulating material has a first side 42, a second side 44, and a central portion 46 with the central portion connected to two end portions, 48 and 50, having raw ends 52 and 54, respectively. In forming the slot liner 36 illustrated in FIGS. 1 and 2 from the piece of insulating material, the opposite end portions 48 and 50 are folded in opposite directions relative to the central portion 46 and relative to each other. This opposite direction folding technique is illustrated in FIGS. 3 and 4. Referring to FIG. 3, end portion 48 is folded along line 56 in one direction relative to the central portion of the insulating material so that raw end 52 is disposed adjacent the first side 42 as illustrated in FIG. 4. End portion 50 is folded along line 58 in the opposite direction relative to the central portion of the insulating material so that raw end 54 is disposed adjacent the second side 44 as illustrated in FIG. 4.

As shown in FIG. 4, the method of folding the piece of insulating material forms a slot insulator with sections of double thickness at each end or extremity for added strength. This opposite direction folding method further causes the raw ends 52 and 54 of the insulating material to be disposed on opposite sides of the central portion of the insulating material. This opposite disposition of the raw ends facilitates both insertion of the slot liner and insertion of coils into the slots of the magnetic core as will be discussed hereinbelow.

FIG. 5 illustrates a slot liner identical to the slot liner of FIG. 4 except for the addition of cuffs 60 and 62. The cuffs promote retention of the slot liner within the slot of the stator core, give added strength to the insulating material at the edges of the core slots and provide separation of the coils from the faces of the stator core.

The cuffs 60, 62 are formed by performing two additional folding steps on the slot liner material of FIG. 4. In forming cuff 60, the double thickness section of the slot liner having raw end 52, is folded along line 64 toward the central portion 46 so that the folded double thickness material is disposed adjacent the first side 42. Cuff 62 is formed by folding the double thickness section of the slot liner having raw end 54 in the same direction along line 66 toward the central portion 46 so that the folded double thickness material is also disposed adjacent first side 42.

FIG. 6 shows a side elevational view of the slot liner of FIG. 5 formed by the above-described method. As illustrated, the slot liner has sections of double thickness material at each end thereof connected to central portion 46. The raw ends 52 and 54 are disposed adjacent opposite sides 42 and 46 of the slot liner. In addition, the cuffs 60 and 62, formed from the sections of double thickness material, extend in a common direction relative the central portion with both being disposed adjacent the first side 42.

FIG. 7 shows the slot liner of FIGS. 5 and 6 shaped to conform to and ready for insertion into one of the slots 28 of the magnetic core illustrated in FIGS. 1 and 2 with the sides 42 and 44 establishing outer and inner peripheral surfaces, respectively, of the slot liner.

FIGS. 8, 9, and 10 show detailed sectional views of one of the core slots 28 of FIGS. 1 and 2 and illustrate a preferred method of inserting the slot liner. Referring to FIG. 8, the stator core slot 28 has a wall 66 and edges 38, 39. The slot extends the axial length of the stator magnetic core and is separated from an adjacent slot by a section 68 of the stator magnetic core. The slot liner 36, also depicted in FIG. 8, is inserted axially into the core slot using conventional slot inserting equipment. In carrying out this insertion, the slot liner 36, formed by the previously discussed method in reference to FIGS. 3-5, is oriented so that the leading end 69 or the end of the slot liner to be inserted first has the raw edge 52 disposed along the surface 42 of the slot liner. The slot liner is then axially inserted into the stator core slot in the direction indicated by arrow 70.

FIG. 9 illustrates the slot liner at an intermediate point of travel during its insertion into the core slot. As can be seen, the slot liner is inserted with its raw edge 52 disposed adjacent the wall 66 of the slot, thus the leading end of the slot liner travels smoothly past slot edge 38 without any unfolding of its double thickness end portion. Further because trailing end 71 of the slot liner has its raw edge 54 disposed adjacent the surface 44 or on the side of the slot liner opposite raw edge 52, the trailing end of the slot liner also travels past slot edge 38 without unfolding. Thus, the slot liner is fully inserted as shown in FIG. 10 with both double thickness end portions in tact.

As illustrated in FIG. 10, the slot liner, when fully inserted, has double thickness end portions adjacent to the slot edges 38 and 39 for maximum abrasion resistance. In addition, the liner cuffs 60 and 62 rest on the magnetic core faces 24 for retaining the slot liners within the slot and also for separating the coils from the core faces.

After the slot liners have been inserted into the slots of the magnetic core, electrical coils are then inserted into the slots. FIGS. 11 and 12 show detailed sectional views of two core slots with slot liners 36 therein and illustrate the method of inserting the coils 32 relative the slot liners. The coils may be inserted by using conventional coil or winding insertion equipment. The parts of the equipment actually shown in FIGS. 11 and 12 correspond to the type of coil winding and placing equipment shown, e.g., in Schlaudroff et al U.S. Pat. No. 3,879,842 or Mason U.S. Pat. No. 2,934,099. However, it should be appreciated that other types of equipment may also be used.

Referring to FIGS. 11 and 12, coils 32, are axially inserted in generally the same direction relative to core 22, indicated by arrow 70, as was employed, for insertion of the slot liners. The coils are moved into the slot openings and travel over the double thickness end portion having raw end 54. By inserting the coils in the same direction as was employed for insertion of the slot liners, the coils travel smoothly over raw edge 54 of the slot liner without any hang-ups or unfolding of the slot liner. Further, because the slot liner was formed by the method previously described and because such method provided an opposite direction folding of the ends of the slot liner, raw edge 52 is disposed adjacent the slot wall, thus, the coils can be fully inserted as shown in FIG. 12 without hanging up on raw edge 52 or tending to unfold the slot liner.

With the disclosed method of fabricating a slot liner, insulating material of lesser thickness can be employed for lining the slots of the magnetic core. The disclosed slot liner provides insulating material of double thicknesses at the slot edges where maximum abrasion resistance is required. In addition, the disclosed slot liner with oppositely disposed raw ends permit both the slot liners and the coils to be inserted into the slots of the stator core with conventional insertion equipment without causing equipment hang-ups due to unfolding of the slot liners or snagging of the raw edges.

Alternatively, the slot liner may be placed radially into the slots of the stator magnetic core. The coils may be subsequently inserted axially into the slots of the core in a direction determined by the disposition of the raw ends. For example, referring to FIG. 10, the slot liner may be radially placed within the slot so that raw ends 52 and 54 are reversed, that is, raw edge 52 is located near slot edge 38 rather than near slot edge 39. The conductor portions of the coils are then axially inserted into the core slot in a direction opposite the direction 70 to prevent any unfolding or snagging of the raw edge 54. On the other hand, if the slot liner was placed radially within the slot so that the raw ends are positioned identically as shown in FIG. 10, then the coils would be inserted axially into the slot in the direction 70 as previously described in reference to FIGS. 11 and 12.

While there have been shown and described herein preferred embodiments of the present invention, it should be apparent to persons skilled in the art that numerous modifications may be made therein without actually departing from the true spirit and scope of the invention. Accordingly, it is intended by the appended claims to cover all modifications which come within the spirit and scope of this invention.

What I claim as new and desire to secure by Letters Patent of the United States is:

1. A method of making a stator assembly including insulating a magnetic stator core having axially extending slots therein with slot liners formed from insulating material and having opposite end portions thereof folded in opposite directions relative to each other and relative to a longitudinally extending central portion thereof so that the slot liners have folded leading and trailing end portions of double thickness material having the raw ends thereof disposed on opposite sides of the piece of insulating material; the method comprising: advancing the folded leading end of each slot liner axially along an axially extending slot of the stator core with the raw end thereof being advanced first and being disposed adjacent a wall of a slot; advancing each such slot liner along the axially extending slot until the slot liner, including its folded trailing end portion is disposed within the slot, with the raw end of the folded trailing end portion being separated from the slot wall by at least the central portion of the slot liner; advancing conductor portions of coils axially in the slots with slot liners positioned therein in a direction relative to the core generally the same as that employed for advancing the slot liners relative to the core, with the conductor portions being first moved over the folded trailing end portion of each such slot liner and the raw end thereof; and advancing the conductor portions axially along the slot until they are disposed within the slot and separated from the raw end of the leading end portion of each such slot liner by at least the central portion of each such slot liner.

2. A method of making a stator assembly, the method comprising: forming a slot liner from a piece of insulating material by folding opposite end portions thereof having first and second raw ends thereon in opposite directions relative to each other and relative to a central portion of the insulating material thereby establishing folded leading and trailing end portions having the raw ends thereon disposed on opposite sides of the central portion of the piece of insulating material; advancing the folded leading end portion of the slot liner axially along a slot of a stator core with the raw end thereof being advanced first and being disposed adjacent a wall of the slot; advancing the slot liner along the axially extending slot until the slot liner including its folded trailing end portion is disposed within the slot with the raw end of the folded trailing end portion being separated from the slot wall by at least the central portion of the slot liner; advancing conductor portions of coils axially into the slots with slot liners positioned therein in a direction relative to the core generally the same as that employed for advancing the slot liners relative to the core, with the conductor portions being first moved over the folded trailing end portion of the slot liner and the raw end thereof; and advancing the conductor portions axially along the slot until they are disposed within the slot and separated from the raw end of the leading end portion of the slot liner by at least the central portion of the slot liner.

3. The method of claim 2 and further including folding the leading and trailing end portions of the slot liners upon themselves in a common direction relative to the central portion of the insulating material to form cuffs of double thickness material.

* * * * *